No. 634,981. Patented Oct. 17, 1899.
C. A. HIRTH.
LATHE FOR TURNING BALLS.
(Application filed Nov. 28, 1898.)
(No Model.) 3 Sheets—Sheet 1.

Witnesses:
A. G. Heymann
F. L. Ourand

Inventor
Carl A. Hirth
by Herbert W. T. Jenner
Attorney

No. 634,981. Patented Oct. 17, 1899.
C. A. HIRTH.
LATHE FOR TURNING BALLS.
(Application filed Nov. 28, 1898.)

(No Model.) 3 Sheets—Sheet 2.

No. 634,981. Patented Oct. 17, 1899.
C. A. HIRTH.
LATHE FOR TURNING BALLS.
(Application filed Nov. 28, 1898.)
(No Model.) 3 Sheets—Sheet 3.

Witnesses:
A. G. Heysinger
F. L. Durand

Inventor.
Carl A. Hirth
by Herbert W. T. Jenner.
Attorney

UNITED STATES PATENT OFFICE.

CARL ALBERT HIRTH, OF STUTTGART, GERMANY.

LATHE FOR TURNING BALLS.

SPECIFICATION forming part of Letters Patent No. 634,981, dated October 17, 1899.

Application filed November 28, 1898. Serial No. 697,635. (No model.)

*To all whom it may concern:*

Be it known that I, CARL ALBERT HIRTH, residing at Stuttgart, in the Kingdom of Würtemberg and Empire of Germany, have invented certain new and useful Improvements in Turning-Lathes, of which the following is a specification.

This invention relates to lathes for turning balls or spheres; and it consists in the novel construction and combination of the parts hereinafter fully described and claimed.

Figure 1:
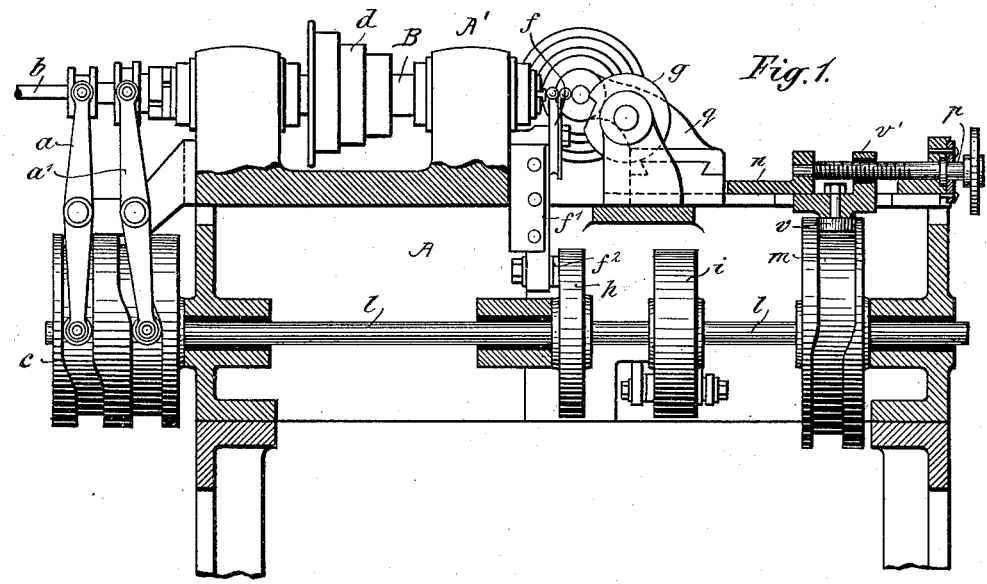
Figure 3:
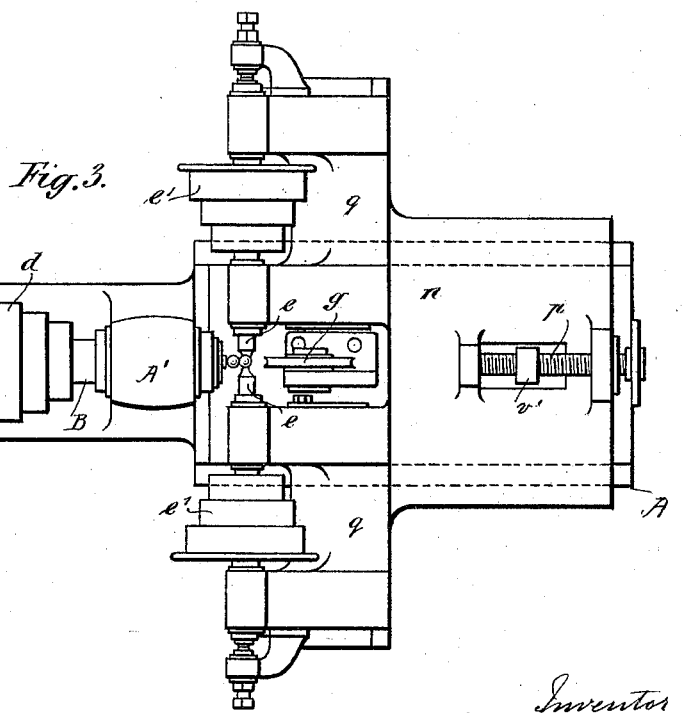
Figure 2:
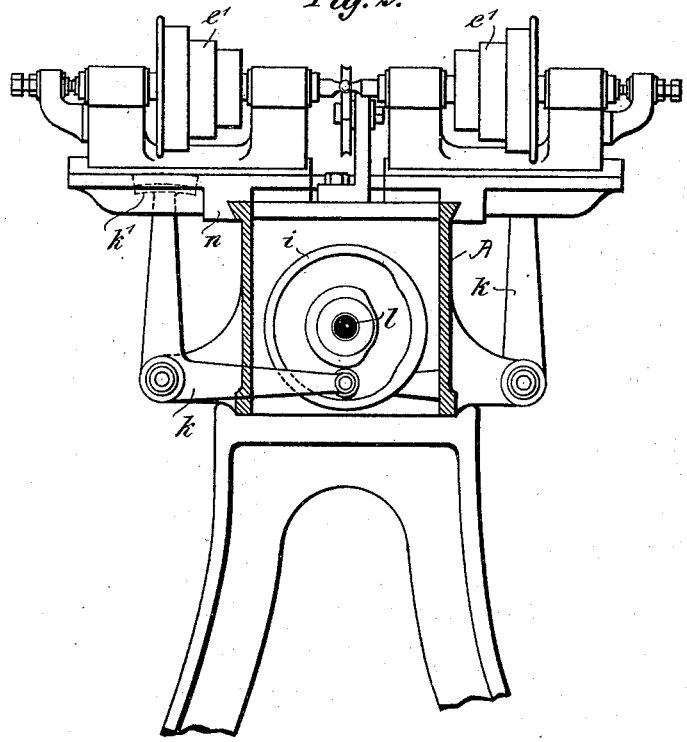
Figure 4:
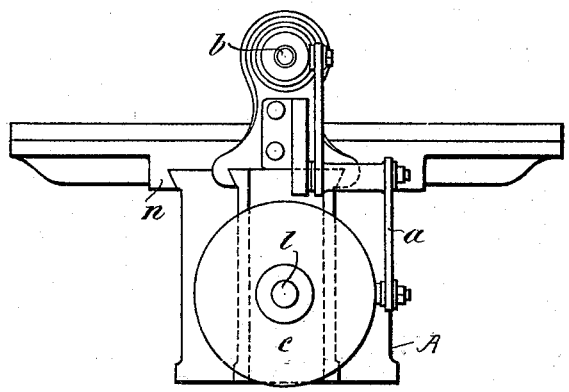
Figure 5:
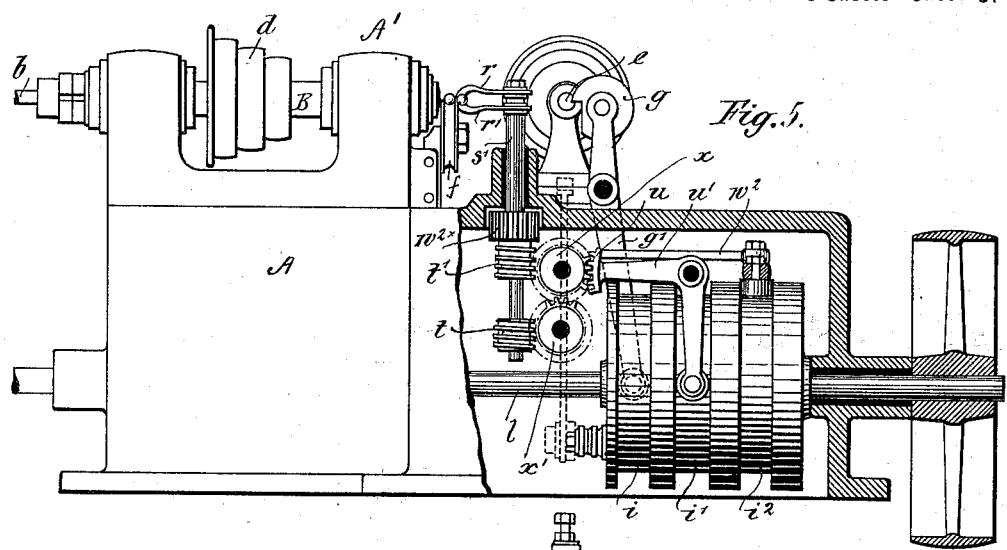
Figure 6:
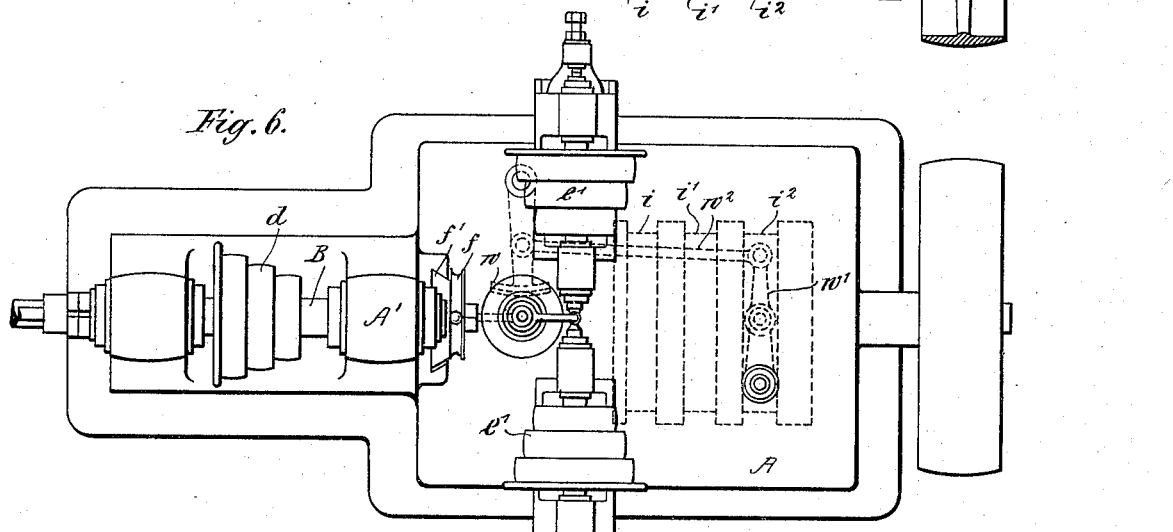
Figure 7:
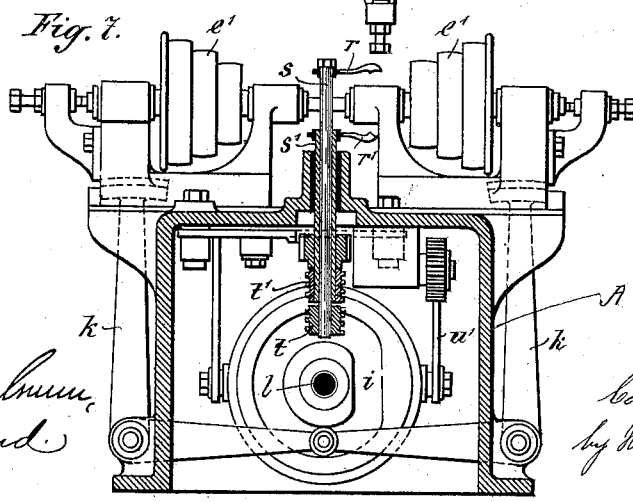

In the drawings, Figure 1 is a longitudinal section through the lathe. Fig. 2 is a cross-section through the lathe. Fig. 3 is a plan view of the lathe. Fig. 4 is an end view showing the lever $a$. Fig. 5 is a side view of a modification of the lathe, partly in longitudinal section. Fig. 6 is a plan view of the same. Fig. 7 is a cross-section of the lathe shown in Fig. 5.

A is the lathe-bed, provided with a head-stock A', in which a hollow spindle B is journaled. The spindle B is driven by a cone-pulley $d$ in the usual manner. A bar or blank $b$ is fed intermittently through the hollow spindle and is revolved by it. A driving-shaft $l$ is provided and is revolved in any approved manner. The balls are turned from the bar $b$, and the bar is fed step by step through the hollow spindle B by any approved mechanism for that purpose—as, for instance, a double cam $c$—and pivoted levers $a$ $a'$ operatively connected with the bar $b$ and oscillated by the said cam.

A turning and cutting-off tool $f$ is arranged crosswise of the spindle B at its front end and is secured to a slide which is slidable in a guide $f'$. The tool $f$ is reciprocated by a cam $h$, secured on the shaft $l$, which engages with a roller $f^2$ on the tool-slide. The tool $f$ is shaped so as to turn the end portion of the rod $b$ to the form of a partial sphere and to cut off the said partial sphere when it turns a second partial sphere close behind the first.

A carriage $n$ is supported by the bed A and is slidable thereon longitudinally of the spindle B. Two head-stocks $q$ are carried by the carriage $n$ and are slidable on it transversely of the spindle B. Spindles $e$ are journaled in the head-stocks $q$, and cone-pulleys $e'$ are provided for driving the spindles $e$. The adjacent ends of the spindles $e$ are cupped, so that they can engage with and grip a partial sphere when cut off from the bar $b$ and revolve the said partial sphere upon an axis at a right angle to the axis upon which it was revolved by the spindle B.

The head-stocks $q$, together with the spindles $e$, are constrained to move simultaneously toward or away from each other by any approved mechanism. A double cam $i$ is secured on the shaft $l$ and operates two bell-crank levers $k$, which are pivotally supported from the bed A and operatively connected with the head-stocks $q$. Toothed segments $k'$ are preferably formed on the upper ends of the bell-crank levers and gear into teeth on the head-stocks $q$, so that the said head-stocks and the carriage $n$ can be slid longitudinally of the spindle B without disconnecting the head-stocks $q$ from the bell-crank levers.

The longitudinal movement of the carriage $n$ is effected by a cam $m$, secured on the shaft $l$, which engages with a roller $v$. The roller $v$ is supported by a bracket $v'$, which is adjustably connected to the carriage $n$ by a screw $p$, so that the spindles $e$ can be set to engage with the partial sphere on the end of the bar $b$.

A second turning-tool $g$ is supported from the bed A in front of the spindle B.

When the bar $b$ is moved forward, so that the tool $f$ may turn a second partial sphere on it, as shown in Fig. 1, the carriage $n$ is moved back, so that the axes of the spindles $e$ are in line with the center of the first partial sphere, as shown in Fig. 3, and the spindles are moved toward each other, so as to clip the first partial sphere automatically at the moment the said first partial sphere is cut off by the tool $f$. The carriage $n$ is then moved rearwardly and the spindles $e$ are revolved, so that the first partial sphere is finished and completed by being revolved in contact with the turning-tool $g$. The bar $b$ is moved forward another step while the first partial sphere is being operated on by the tool $g$, and the spindles $e$ are moved apart, so that the sphere drops from between them as soon as it is completed.

In the modification shown in Figs. 5, 6, and 7 the spindles $e$ are not moved longitudinally of the spindle B and the first partial sphere is seized by jaws $r$ $r'$ as soon as it is cut off and is transferred by them to the spindles $e$. The upper jaw $r$ is carried by a shaft $s$, and the lower jaw $r'$ is carried by a tubular shaft $s'$, which is slidable vertically in a bearing on the bed A. The shaft $s$ is also slidable vertically in the shaft $s'$, and the shaft $s'$ is provided with a toothed wheel $w^{2\times}$ for oscillating it. A toothed segment $w$ is pivoted to the bed A and gears into the said wheel. An arm $w'$ is also pivoted to the bed and is rocked by a cam $i^2$, secured on the shaft $l$. The arm $w'$ is connected with the segment $w$ by a connecting-rod $w^2$. The jaws are operated by two toothed wheels $x$ $x'$, which engage with circular racks $t$ $t'$, secured on the shafts $s$ and $s'$, respectively. The wheels $x$ $x'$ also gear into each other, so that they move simultaneously in opposite directions. The wheels $x$ $x'$ are oscillated by a pivoted bell-crank lever $u'$, one arm of which is connected with a cam $i'$ on the shaft $l$. The other arm of the bell-crank lever carries a toothed segment $u$, which is connected either directly or indirectly with one of the wheels $x$ or $x'$, so that the jaws seize and liberate the partial sphere at the proper moments. The tool $g$ is moved into contact with the partial sphere when the same is being revolved by the spindles $e$ by means of a pivoted lever $g'$, which is operatively connected with a cam $i$, secured on the shaft $l$. The remaining parts of the modified lathe are similar to those previously described where designated by the same reference-letters.

What I claim is—

1. In a lathe for turning balls, the combination, with a hollow revoluble spindle, means for feeding a bar step by step through the said spindle, and a tool slidable transversely of the said spindle and operating to turn and cut off a partial sphere from the said bar; of two opposed revoluble spindles arranged with their axes in line with each other and crosswise of the said hollow spindle, means for moving the said two spindles toward each other so as to grip the said partial sphere, and a second tool operating to complete the partial sphere, substantially as set forth.

2. In a lathe for turning balls, the combination, with a hollow revoluble spindle, means for feeding a bar step by step through the said spindle, and a tool slidable transversely of the said spindle and operating to turn and cut off a partial sphere from the said bar; of two opposed revoluble spindles arranged with their axes in line with each other and crosswise of the said hollow spindle, means for moving the two said hollow spindles toward each other so as to grip the said partial sphere, a second tool operating to complete the partial sphere, and means for moving the two said spindles longitudinally of the said hollow spindle so as to place the said partial sphere in contact with the said second tool, substantially as set forth.

3. In a lathe for turning balls, the combination, with two opposed revoluble spindles arranged with their axes in line with each other, and means for moving the said spindles toward each other so as to grip a partial sphere; of a carriage supporting the said two spindles and slidable transversely of their axes, an adjustable bracket connected to the said carriage, means for sliding the said carriage connected to the said adjustable bracket, and a tool for completing the partial sphere, substantially as set forth.

4. In a lathe for turning balls, the combination, with a bed, and a head-stock provided with a spindle which supports a blank; of a carriage slidable on the bed parallel with the said spindle and in front of it, two head-stocks slidable on the said carriage transversely of the said spindle and one on each side of it, a pair of opposed revoluble spindles carried by the said slidable head-stocks, means for sliding the said slidable head-stocks and the carriage respectively, and two tool-supports arranged one in front and the other behind the said pair of spindles, substantially as set forth.

In testimony whereof I affix my signature in presence of two witnesses.

CARL ALBERT HIRTH.

Witnesses:
H. WAGNER,
WM. HAHN.